United States Patent [19]
Hosoe

[11] Patent Number: 6,047,376
[45] Date of Patent: Apr. 4, 2000

[54] CLIENT-SERVER SYSTEM, SERVER ACCESS AUTHENTICATION METHOD, MEMORY MEDIUM STORES SERVER-ACCESS AUTHENTICATION PROGRAMS, AND ISSUANCE DEVICE WHICH ISSUES THE MEMORY MEDIUM CONTENTS

[75] Inventor: Makoto Hosoe, Kanagawa-prefecture, Japan

[73] Assignee: Toshiba Information Systems (Japan) Corporation, Kawasaki, Japan

[21] Appl. No.: 08/825,554

[22] Filed: Mar. 19, 1997

[30]    Foreign Application Priority Data

Oct. 18, 1996   [JP]   Japan   .................................... 8-276325

[51] Int. Cl.[7] .................................................. G06F 12/14
[52] U.S. Cl. .......................... 713/201; 713/202; 709/227
[58] Field of Search ........................... 395/187.01, 200.8, 395/200.57, 186, 188.01

[56] References Cited

U.S. PATENT DOCUMENTS

| | | | |
|---|---|---|---|
| 5,455,953 | 10/1995 | Russell | 395/739 |
| 5,548,729 | 8/1996 | Akiyoshi et al. | 395/200.16 |
| 5,586,260 | 12/1996 | Hu | 395/200.2 |
| 5,671,354 | 9/1997 | Ito et al. | 395/187.01 |
| 5,696,902 | 12/1997 | Leclercq et al. | 395/200.2 |
| 5,706,427 | 1/1998 | Tabuki | 395/187.01 |
| 5,742,611 | 4/1998 | Brandin | 370/473 |

*Primary Examiner*—Ayaz R. Sheikh
*Assistant Examiner*—Raymond N Phan
*Attorney, Agent, or Firm*—Finnegan, Henderson, Farabow, Garrett & Dunner, L.L.P.

[57]   ABSTRACT

It is necessary to authenticate each access by permitting or refusing it when a client makes an access to a server in a client-server system in which clients and servers are interconnected via a network. The client utilizes memory medium which stores both the server address and the memory medium's identification information. The client also uses a read-out device to fetch the contents of the memory medium and uses thus read out server address, to be connected to a desired server and then transmits the above-mentioned read out identification information to ask for server access permission. The server, in response, when having received a server access permission request from the client, compares the memory medium identification information sent upon permission requesting to identification information stored beforehand and, based on the comparison results, sends the client the authentication of server access permission or refusal.

6 Claims, 6 Drawing Sheets

| IDENTIFICATION NUMBER | VALIDITY PERIOD |
|---|---|
| 2 1 1 3 | '96 - 12 - 1 |
| 2 1 1 5 | '96 - 12 - 31 |
| ⋮ | ⋮ |
| 3 2 4 6 | '97 - 3 - 31 |

| IDENTIFICATION NUMBER | VALIDITY PERIOD | |
|---|---|---|
| 0 0 1 1 | '96 - 11 - 30 | MUSIC INFORMATION |
| 0 0 1 2 | '96 - 12 - 31 | |
| ⋮ | ⋮ | |
| 0 0 5 6 | '97 - 3 - 31 | |
| 1 0 0 1 | '96 - 11 - 30 | COMMUNICATION EDUCATION |
| ⋮ | ⋮ | |
| 1 0 1 2 | '97 - 3 - 31 | |
| 3 0 0 1 | '96 - 11 - 30 | VERSION UPGRADE |
| ⋮ | ⋮ | |
| 3 0 5 9 | '96 - 12 - 31 | |

CLIENT-SERVER SYSTEM, SERVER ACCESS AUTHENTICATION METHOD, MEMORY MEDIUM STORES SERVER-ACCESS AUTHENTICATION PROGRAMS, AND ISSUANCE DEVICE WHICH ISSUES THE MEMORY MEDIUM CONTENTS

FIELD OF THE INVENTION

This invention relates to a client-server system in which clients (client machines ) and servers(server machines) are interconnected via a network, a server access authentication method for use in this client-server system, a memory medium stores server access authentication programs, and an issuance device which issues the memory medium contents.

PRIOR ART

In the conventional server-client systems realized via a network, the user must input his login name and password so that his access to a server is authenticated. In response, the server decides whether the access should be permitted, by comparing those login name and password to those registered beforehand on his side.

According to such conventional method, however, the user must remember his password and also input his login name and password, inflicting troublesome burdens on his own side. Moreover, this conventional method suffers from a respect that if a password is known to any other people, this password may possibly be used in an illegal server access. The present invention attempts to solve such a problem that exists in the server access authentication method in the conventional server-client systems.

OBJECTS OF THE INVENTION

It is therefore an object of the present invention to provide a server-client system and a server access authentication method whereby the user can easily obtain his legal server access and, at the same time, an illegal server access by others can be prevented. Other object of the present invention is to provide memory medium stores server access authentication programs which realize such server-client system and server access authentication method. A different one object of the present invention is provide a issuing device which issues the memory medium contents.

SUMMARY OF THE INVENTION

A client-server system according to the present invention is used by clients and servers interconnected by the network, in which those clients have a read-out device which reads out the memory medium contents. The read-out device have detachably mounted memory medium which stores the server addresses and its own identification information.

The clients have an access permission request means that the clients can use a desired server address read out using this read-out device, to be connected to the server, and can also clients send the memory medium identification information read out by it to request server access permission.

The abovementioned server, on the other hand, has a memory means stores the memory medium identification information based on which a server access is to be permitted. And the server has access authentication control means for comparing the memory medium identification information stored in the memory means to the memory medium identification information that sent upon server access permission request by the client.

The access authentication control means sends server access permission or refusal to the client, based on the comparison results.

With this system, therefore, the client reads out both the server address and the memory medium identification information from the memory medium mounted on itself and then uses thus read out the server address, to be connected to the sever and, at the same time, sends thus read out the memory medium identification information to ask for server access permission. The server, on the other hand, compares the memory medium identification information sent upon server access permission requesting by the client to the identification information registered beforehand and, based on the comparison results, sends the authentication of server access permission or refusal. Thus, only the client having legal memory medium is given server access permission.

In a client-server system as claimed in claim 2 of the present invention, the memory means mounted on the server, stores the information of a period for which a server access must be permitted according to the memory medium identification information. The server access authentication control means references this period information stored in the abovementioned memory means based on the memory medium identification information sent upon server access permission request by the client, to give authentication of server access permission or refusal to the client. Thus, the users can utilize the system by setting a period for which an access to the server is permitted. That is, a client having certain memory medium will be permitted to access the sever only on setting the period.

A client-server system as claimed in claim 3 of the present invention features that memory medium stores both the server address and the identification information stored in memory medium are enciphered beforehand and would then be deciphered by decipherment means provided on the client when it has read them out.

The server address and the identification information are thus enciphered beforehand, so that it is possible to prevent illegal interception of the server address or the identification information.

A client-server system as claimed in claim 4 of the present invention features that the memory medium stores one or a plurality of identification information pieces corresponding to a plurality of service pieces provided by the server. Thus, it is possible to serve the users by providing one or a plurality of service sections in a plurality of service pieces given by the server.

A server access authentication method according to the present invention is used in the client-server system in which clients and servers are interconnected via a network. By this method the client reads out the contents of the memory medium that stores the server address and the memory medium identification information and uses this server address read out by the read-out device to be connected to the server and then sends the memory medium identification information read out by the abovementioned read-out device to ask for server access permission. The server, on the other hand, when having received server access permission request from the client, compares the memory medium identification information sent with this request to the memory medium identification information stored beforehand, for the permission of server access and, based on the comparison results, gives the authentication of server access permission or refusal to this client. Thus, only the clients having a legal memory medium are given a server access permission.

According to a server access authentication method as claimed in claim 6, the server beforehand stores the information of a period for which a server access is to be permitted according to the identification information of memory medium. The server, based on the memory medium identification information sent upon server access permission requesting from the client, references the abovementioned period information stored beforehand, to give this client the authentication of server access permission or refusal. Thus, it is possible to make up a system that a client with certain memory medium would have a defined period for which his access is to be permitted.

The memory medium which stores the server access authentication program according to the present invention registers the server address and the memory medium identification information. And also, the memory medium stores a first program to be used by a client computer. The computer use the first program, reading out such the server addresses and the memory medium identification information, and connecting to a desired server by using thus read out the server address, and then transmits thus read out the memory medium identification information for server access permission. Thus, it is possible to mount to a read-out device the memory medium which stores both the server addresses and the memory medium identification information, whose contents are then read out so that the stored programs can be executed. In this case, the client uses thus read out server address, to be connected to the server and, at the same time, transmits thus read out the memory medium identification information to ask for server access permission.

Memory medium as claimed in claim 8 of the present invention, which stores server access authentication programs stores, together with the abovementioned first program, images data, music data, and other data or at least one of the programs different from this first program. Thus, it is possible to obtain the first program for server access authentication from the memory medium which stores images data, music data, other data or also other programs than the first program.

A memory medium issuance device for issuing memory medium which stores the server access authentication programs according to the present invention provides a memory medium can be adapted to a computer system. The issuance device comprising load means. This load means load a memory medium with the memory medium identification information for the server access must be permitted and the server address in a network, and a first program which permits the computer to read out said server address and the memory medium identification information and uses thus read out the server address to be connected to the server and then transmits thus readout the memory medium identification information to ask for server access permission. Thus, it is possible to store in the memory medium the identification information of the memory medium to which the server access stored on the server side must be permitted, this server's server address in the network, and the server access authentication programs and then to issue them.

A memory medium issuance device as claimed in claim 10, which issues the memory medium which stores the server access authentication programs features a respect that it stores, as well as the abovementioned first program, image data, music data, and other data and at least one of those programs different from this first program.

Thus, it is possible to obtain memory medium which stores the first program and images, music, and data and such programs different from the server access authentication first program.

DETAILED DESCRIPTION OF THE INVENTION

Figure 1:
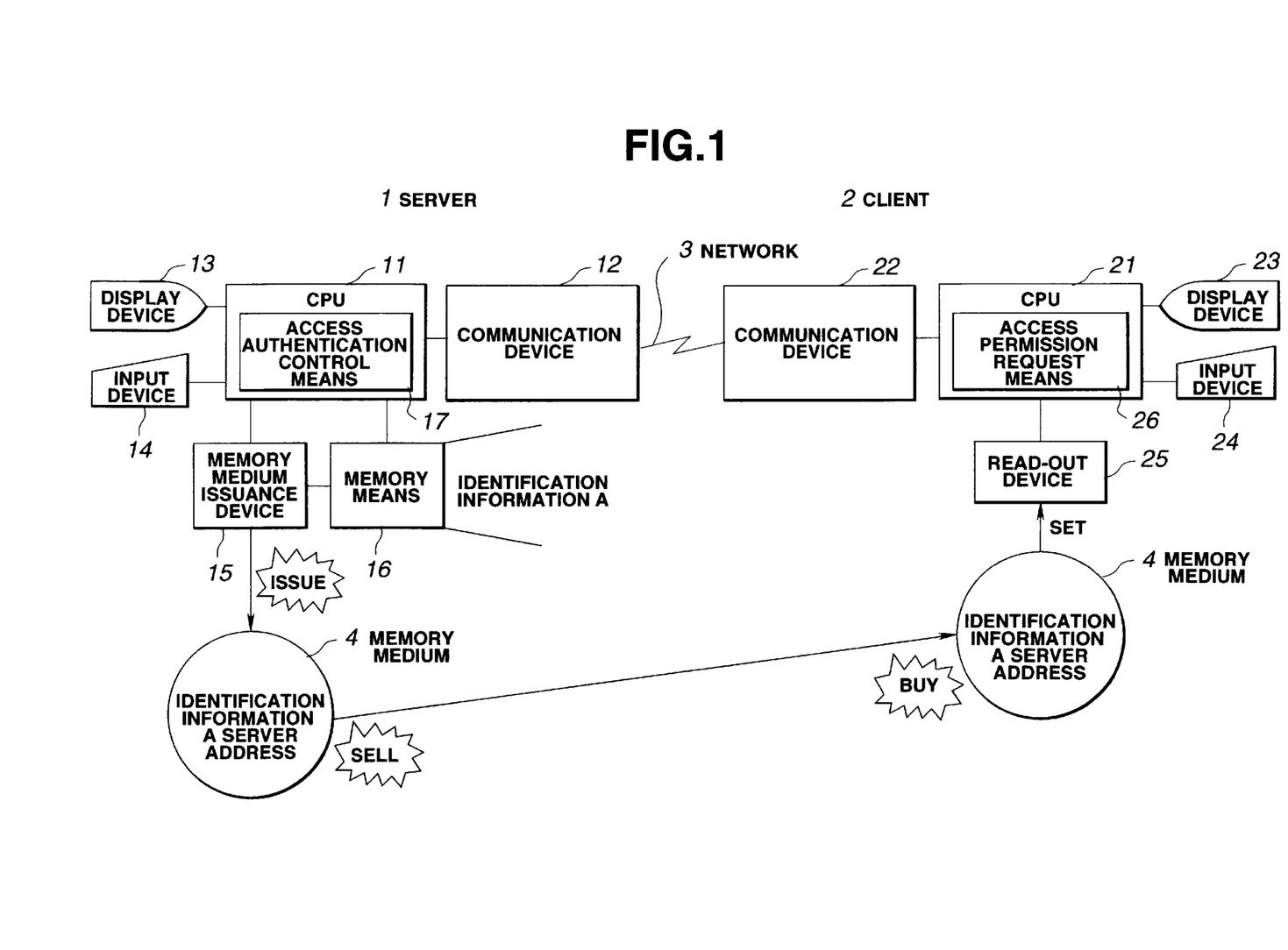
FIG. 1 is a block diagram illustrating a client-server system related to the present invention.

The client-server system, server access authentication method, memory medium which stores the server access authentication program, and issuance device for the memory contents related to the embodiments of the present invention will be described with reference to the accompanying drawings. It is to be noted that the same or similar reference numerals are applied to the same or similar parts and elements throughout the drawings, and the description of the same or similar parts and elements will be omitted. FIG. 1 shows a client-server system related to the embodiment of the present invention. In this client-server system, a client 2 and a server 1 are interconnected via a network 3, in which data is transferred between communication devices 12 and 22.

The server 1 is constructed around the Central Processing Unit (CPU) 11 as the center, in which an input device 14 for inputting of commands or data and a display device 13 for displaying of information are interconnected. The CPU 11 is provided with memory means 16 which stores the identification information of memory medium 4 incorporating CD-ROMs, floppy disks, CD EXTRAs, etc. Also, to the CPU 11 is connected a memory medium issuance device 15. The memory medium issuance device 15 reads the identification information A for the server access must be permitted from the memory means 16, and loads it to memory medium 4. The issuance device 15 read the sever address from own memory, and loads it to memory medium 4. The server address is the address of the server 1 in the network 3. In this case, the memory medium issuance device 15 need not always be part of the server 1 and may be independent of it.

The memory medium 4 issued by the abovementioned memory medium issuance device 15 is sold (or distributed)

and bought (got) by a client 2 user. The client 2 is constructed around the CPU 21 as the center, in which an input device 24 for inputting of commands and data and a display device 23 for displaying of information are interconnected. Also, the CPU 21 is connected to a read-out device 25. The read-out device 25 detachably set memory medium 4 which stores the server address and the memory medium identification information A. The read-out device 25 reads out its memory contents, i.e. the information of the CD-ROMs, floppy disks, CD EXTRAs, etc.

If a user sets memory medium 4 that he bought to the read-out device 25 and gives it necessary commands from the input device 24 to execute a service request direction to a server which has used the memory medium 4, the read-out device 25 will, under the control of the CPU 21, read out a stored server address and identification information A and undergoes fetching by the CPU 21. The CPU 21 then activates access authentication means 26 to connect it to the server 1 by using the server address read out by the read-out device 25 and transmits the memory medium 4's identification information A via the communication device 22 and the network 3, to ask for server access permission to the server 1.

On the side of the server 1, on the other hand, the identification information thus transmitted is received by the access authentication means 17, activated in the CPU 11, that then compares this memory medium 4's identification information A to identification information A stored beforehand in the abovementioned memory means 16 and, depending on the comparison results, gives the client 2 the authentication of server access permission or refusal. Here, the server access permission authentication is sent to the client 2, because both the identification information of the memory medium to which the server access stored in the memory means 16 must be permitted and the identification information sent from the client 2 are "A." Then, service by the server 1 starts for the client 2, which will, for example, receive necessary information.

Figure 2:
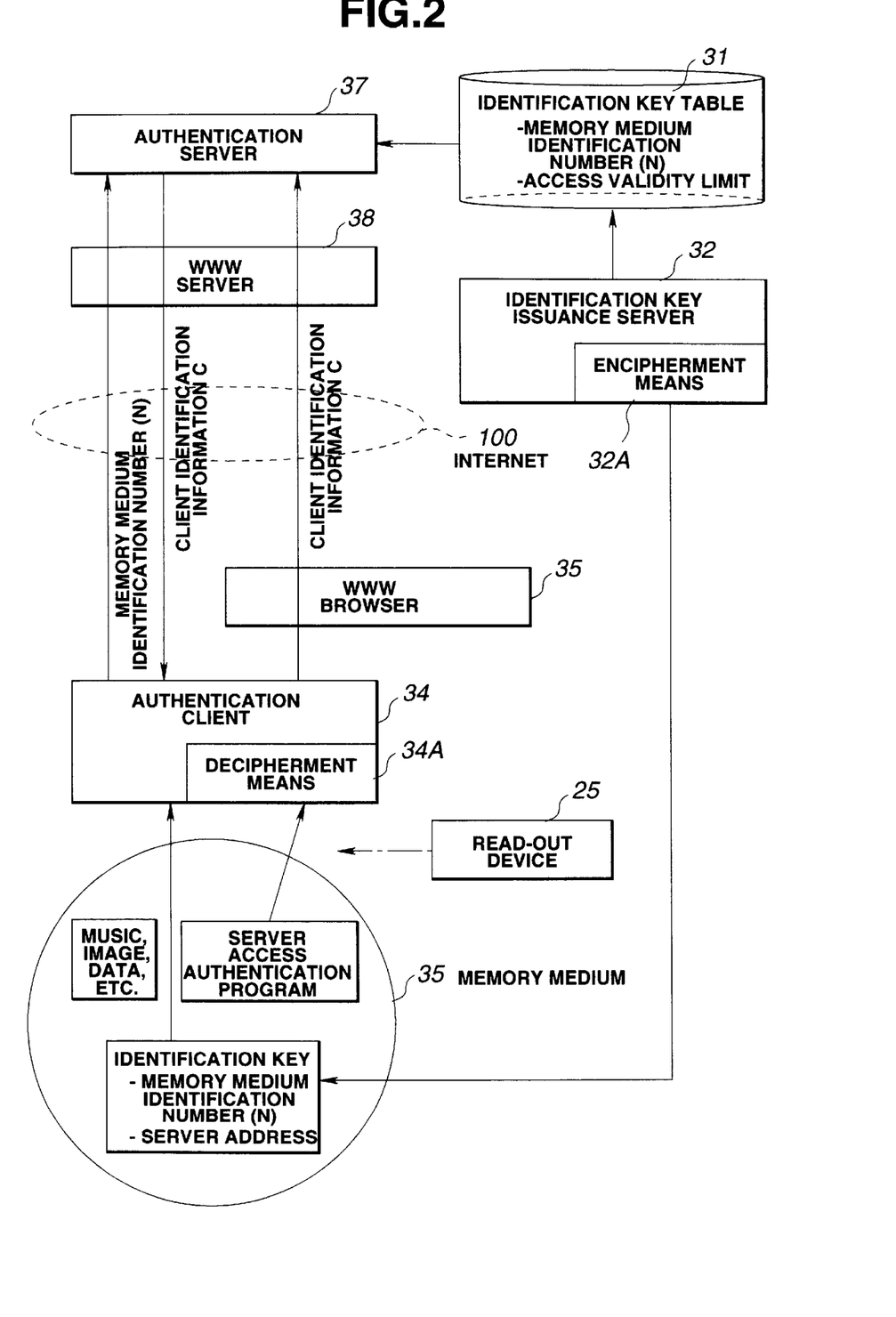
FIG. 2 is a more detailed block diagram illustrating the client-server system related to the present invention.
Figure 5:
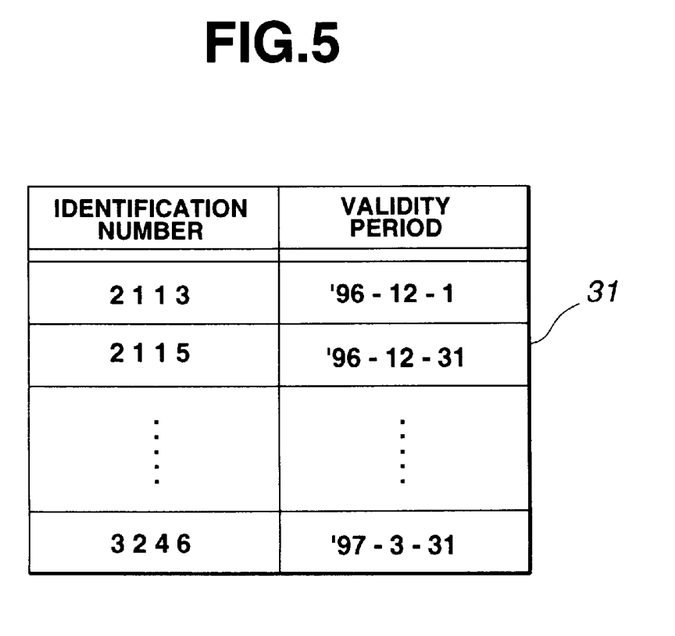
FIG. 5 is an identification key table employed by the first embodiment of the client-server system related to the present invention.

FIG. 2 shows the detailed configuration of a client-server system related to the embodiment of the present invention. This embodiment employs an internet 100 as the network. The server machine connected to th internet 100 is provided with an identification key table 31 corresponding to the memory means 16 in FIG. 1, which stores memory medium identification numbers and the corresponding access validity time limits. An example of this identification key table is shown in FIG. 5, storing the validity periods corresponding to four-digit identification information. The identification information is given a different number for each different memory medium or for each issuance lot of memory medium.

The server machine is provided with an identification key issuance server 32 as memory medium issuance device, which fetches the memory medium identification number from the identification key table 31 and also obtains the relevant server's address (Uniform Resource Locator: URL) which is, for example, entered by the operator to store this address in the memory medium 33. The identification key issuance server 32 is provided with encipherment means 32A, thereby storing the abovementioned server address and the memory medium identification number N which have been enciphered so that they cannot be used as they are even if they are read out illegally, Also, if memory medium 33 happens to be a CD EXTRA, it can be set to the CD player to be used as a compact disk and also to be used as a CD-ROM to the computer, so that it will store various types of information such as music data, image data, other data, etc. shown in FIG. 2. Also, in this embodiment, the server access authentication program is stored. The server access authentication program is read out by the read-out device 25, to act as an authentication client 34, corresponding to an access permission request means 26, at the CPU 21 in such a way that it would read out the server address and the memory medium identification information and use thus read out server address to be connected to the server and then transmit thus read out memory medium identification information in order to ask for server access permission.

This authentication client 34 is provided with decipherment means 34A, corresponding to the identification key issuance server 32's decipherment means 32A, which deciphers the server address and the memory medium identification number which have been enciphered so that they can be converted into such information as can be used as they are.

Various information of music, images, and data and those programs other than the abovementioned server access authentication program may be written with the identification key issuance server 32 but will generally be done so with an exclusive-use writer (write-in device).

The CPU 21 on the client machine is provided with a WWW (World Wide Web) browser 35, which is an exclusive-use program to receive internet information service, would execute processing that is needed to receive service from the server. The CPU11 on the server, on the other hand, is provided with a WWW server 38, which is an exclusive-use program to supply internet information service, and an authentication server 37, equivalent to an access authentication control means 17, which controls the relevant server access authentication corresponding to the authentication client 34.

In the abovementioned client-server system, the user sets memory medium 33 to a read-out device 25 and then directs an input device 24 to activate the server access authentication program for the memory medium 33. Thus, the CPU 21 activates the authentication program 34, to start processing as shown in the FIG. 3 flowchart.

Figure 3:
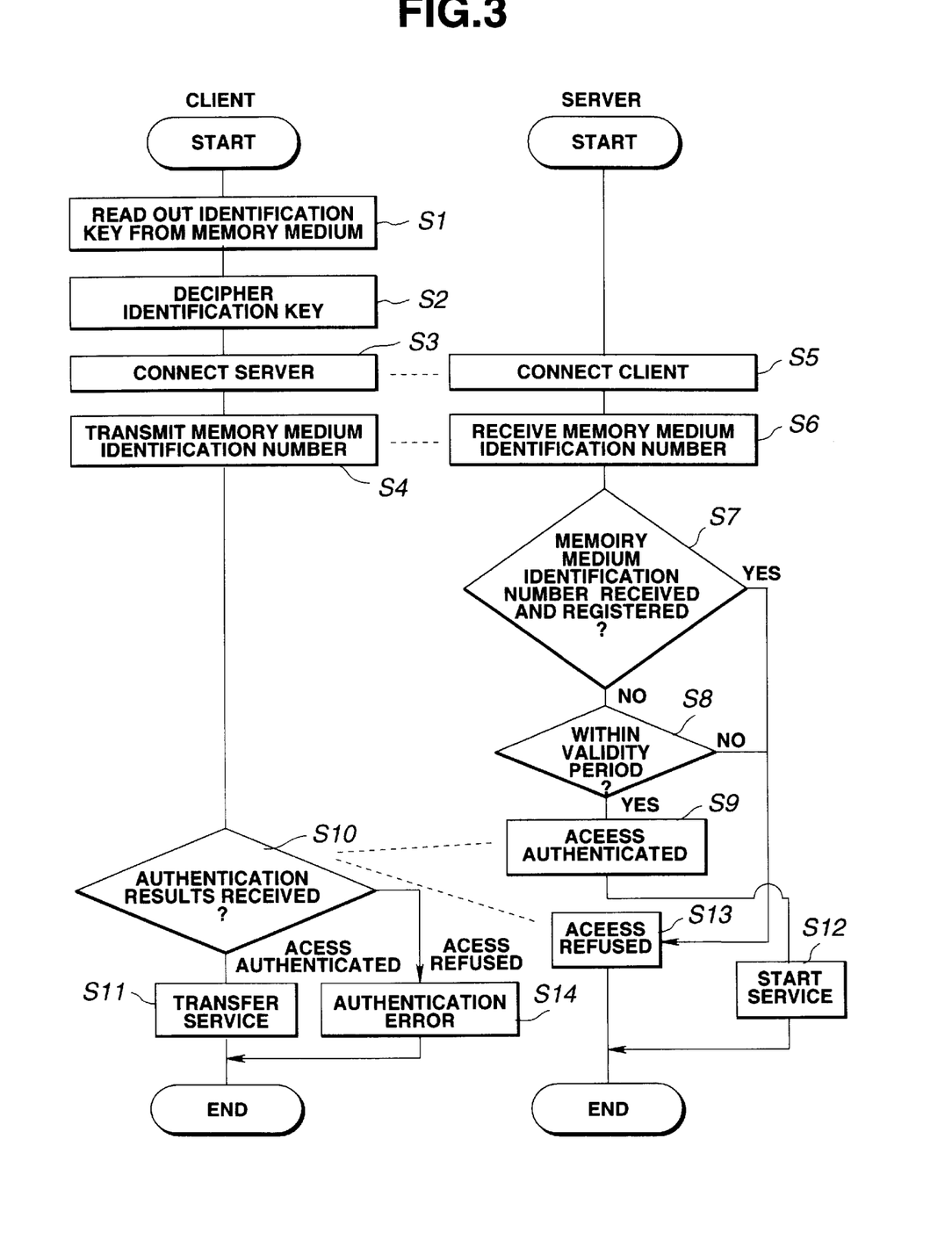
FIG. 3 is a flowchart describing the operation of the first embodiment of the client-server system related to the present invention.
Figure 4:
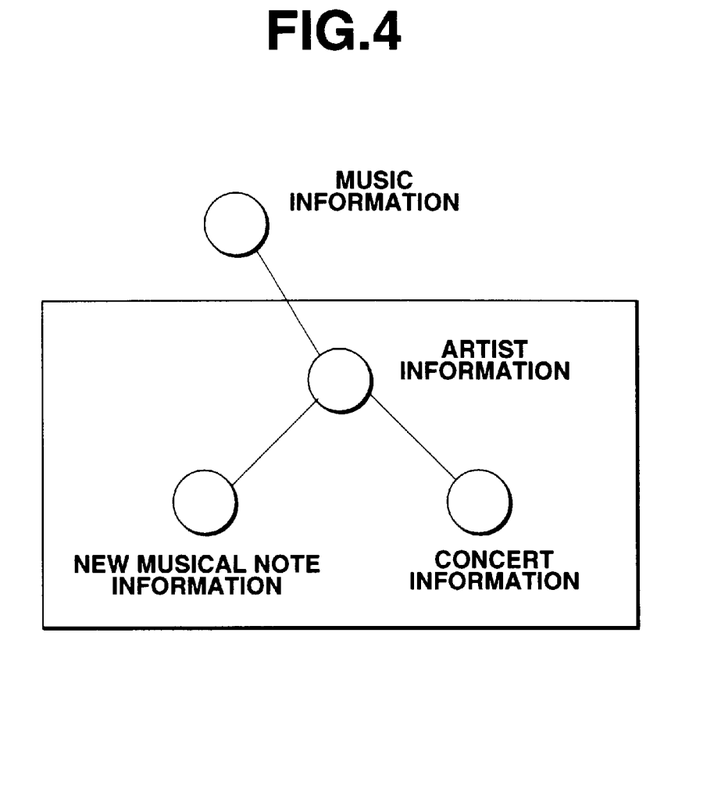
FIG. 4 is a diagram describing service provided by the first embodiment of the client-server system related to the present invention.

First, at step 1 (S1), the authentication client 34 reads out an identification key consisting of a server address and memory medium identification number N from the memory medium 33 via the read-out device 25. Then, at S2, the client 34 uses the decipherment means 34A to decipher them and, at S3, uses thus deciphered server address, to be connected via the internet 100 to a WWW server 38 corresponding to the abovementioned server address and then, at S4, transmits the memory medium identification number N.

The server, on the other hand, receives a connection request to connect a WWW server 38 at S5 and receives the memory medium identification number N sent from the authentication client 34 at S6. The WWW server 38 sends thus received memory medium identification number N to the authentication server 37. In response to this, the authentication server 37 reference an identification key table 31 to check whether the abovementioned memory medium identification number N has been registered beforehand at S7. If the number is known to have been registered, based on the correspondingly stored validity period information, it is detected whether it is within its validity period at S8. If it is proved to be within the validity period as the results of this detection, access permission authentication is sent via the WWW server 38 to the corresponding authentication client 34 at S9. At the same time, the authentication server 37 issues and transmits an enciphered client identification number C. The authentication client 34, waiting for the authentication results, and, when having received the results, checks whether the access is permitted or refused at S10. If the access is permitted, service is transferred at S11. That is, the authentication client 34 activates the WWW browser 35 and also uses the Decipherment means 34A to decipher the abovementioned enciphered client identification information C in order to direct the reception of the service to be given to the WWW browser 35. Then, the WWW browser 35 sends a service start request and also thus deciphered client identification information C to the WWW server 38. The WWW server 38, when having received the service start request and also the deciphered client identification information C, sends that information C to the authentication server 37 to inquire whether it is a legal client identification number. The authentication server 37 uses its client identification information C which has already been issued by not enciphered yet, to compare it to the client identification number C related to the inquiry and then returns the WWW server 38 a response of whether it is legal information or not. If it is legal, the WWW server 38 starts service for the relevant client.

If, on the other hand, the memory medium identification information is known not to have been registered in the identification key table 31 or not to have been within the validity period, the authentication server 37 returns access refusal at S13. The authentication client 34, when having received this refusal, posts an authentication error to a display device 23 at S14 to end the processing.

The above procedure enables only the user who bought a CD EXTRA storing, for example, some music to enjoy the corresponding music information via the internet 100. This music information is given in such a configuration that its lower-order layer comprises artist information and also its even lower-order layer comprises new music note and concert information, thus providing desired service to the user. Specifically, with the music information service accessed as described above, the user obtains his desired or prescribed artist information and then receives the information of the artist concert date or new music note.

Figure 6:
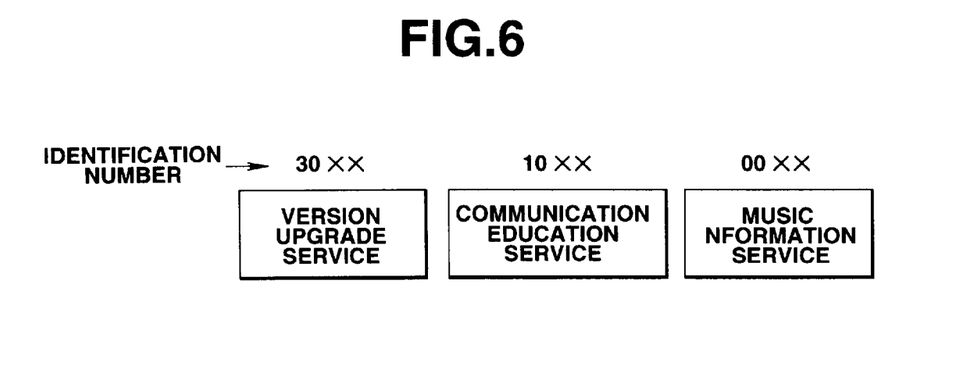
FIG. 6 is a diagram describing service provided by the second embodiment of the client-server system related to the present invention.
Figure 7:
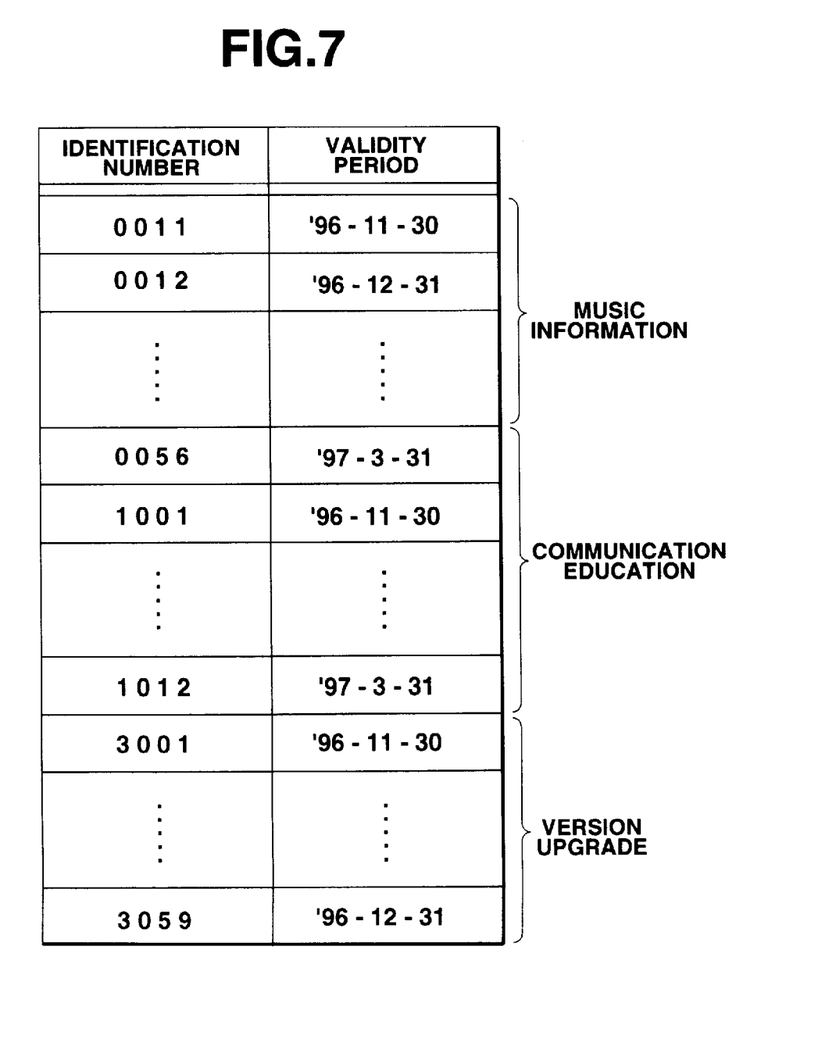
FIG. 7 is an identification key table employed by the second embodiment of the client-server system related to the present invention.

Aside from the abovementioned embodiment, where, for example, a series of service, i.e. service on music information, is provided by the server, one server, as shown in FIG. 6 for example, may provide various types of service such as music information service, communication education service, and version upgrade service. In such a case, each unit of memory medium may store each medium identification number or a plurality of those numbers beforehand, each of which may be selected by the user for his service as occasion demands. As shown in FIG. 6 for example, the high-order two bits of each four-bit identification number can be used to subdivide service. The server, on the other hand, holds such a table as shown in FIG. 7 to identify the service and the validity period and then provide necessary service.

Figure 8:
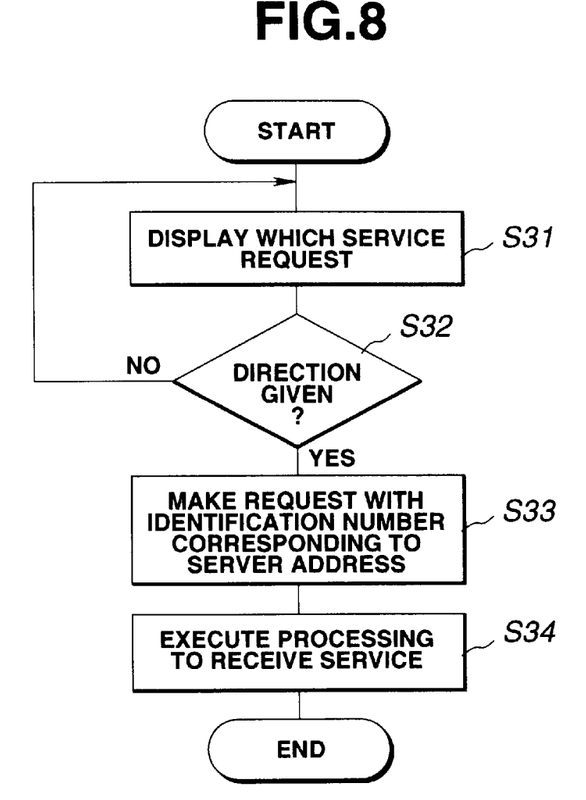
FIG. 8 is a flowchart describing the operation of the second embodiment of the client-server system related to the present invention.
Figure 9:
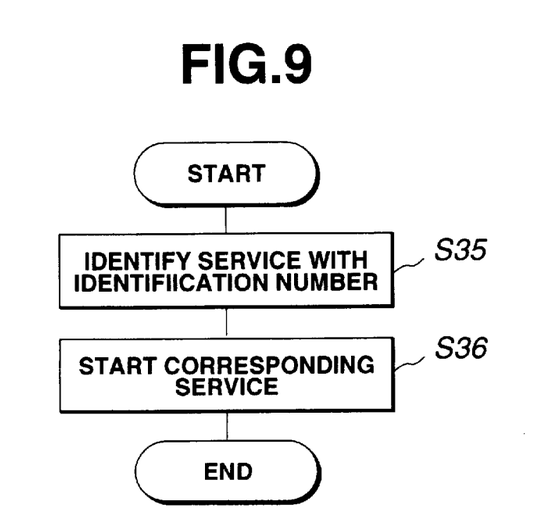
FIG. 9 is another flowchart describing the operation of the second embodiment of the client-server system related to the present invention.

In this case, on the side of the client, such processing as shown in FIG. 8 advances. That is, when the server authentication program is activated, the system indicates at the display device 23 which service is to be requested at S31, detects whether a direction input is given at S32, if it is given, reads out and deciphers the identification number of the service corresponding to the server address, and based on this number, makes an access request at S33, and then advances to the execution of processing to receive the service at S34. The server, on the other hand, executes such processing as shown in FIG. 9. That is, the system uses the identification number sent from the client and also such table as shown in FIG. 7 to identify service corresponding to this identification number at S35, to start the corresponding service at S36. If, in this case, the identification number has not been registered or its validity period has expired, such processing as already described with reference to FIG. 3 will be executed.

Aside from the abovementioned embodiment, in which only one server is assumed, there may be another embodiment where a plurality of servers would provide one or more pieces of service so that one piece of memory medium receives a plurality of and different types of service. In such a case, the server address and the memory medium identification number would correspond to the type of service. Thus, when server access authentication is to be requested, a server address and a memory medium identification number which correspond to the service type are to be used.

The abovementioned embodiments can be applied to such a case as to control accesses to protected pages via the internet, to manage the in-house access right, and to provide via the network the specific masked articles, i.e. those not carried, in magazines to which CD-ROMs, etc. are appended.

As described above, the memory medium stores various information such as (1) the server address and the memory medium identification information; (2) the first program, acting as an authentication client 34 in the above description, which permits the computer to read out the abovementioned server address and the memory medium identification information and uses thus read out server address to be connected to the server and then transmits thus read out memory medium identification information to ask for a server access; and (3) music, images, other data, etc. In this case, the images include still and movable images and the other data includes the characters comprising those of image data and maps, etc. Other programs than the fist program may be stored also.

In short, the relevant memory medium would store the server address, memory medium identification information, and all the information other than the first program. Therefore, only the user who has this memory medium can read out and utilize any information such as the server addresses stored in this memory medium, the memory medium identification information, and the data other than the fist program and also can he surely receive prescribed service from prescribed servers by using the stored server addresses, the memory medium identification information, and the first program.

What is claimed is:

1. A client-server system in which clients and servers are interconnected via a network, wherein each of said clients comprise:
a read-out device for reading out data from a memory medium;
a memory medium for removably connecting to the read-out device, storing a server address and memory medium identification information;
access permission request means for connecting to the server using the server address stored in the memory medium, and transmitting the memory medium identification information to request server access permission; and each of said servers comprise:
memory means for storing identification information for a memory medium for which server access is permitted;
access authentication control means for comparing memory medium identification information sent from a client to the identification information stored in said memory means, and based on a result of the comparison, sends server access permission or refusal to the client;

wherein the access permission request means is stored in the memory medium as software.

2. A client-server system as claimed in claim 1, wherein the memory means stores information of a period for which server access is permitted corresponding to identification information stored in the memory medium; and the access authentication means, based on memory medium identification information sent during a request from the client for server access permission, references the period information stored in said memory means and sends the client authentication information regarding server access permission or refusal.

3. A client-server system as claimed in claim 1, wherein both the server address and the identification information stored in the memory medium are enciphered; and a client is provided with decipherment means which deciphers both the server address and the identification information read out from the memory medium.

4. A client-server system as claimed in claim 1, wherein the memory medium further stores one of a plurality of identification information pieces for each of a plurality of service pieces provided by a server.

5. A server access authentication method used in a client-server system in which clients and servers are interconnected via a network, wherein a client, comprising a memory medium storing a server address and memory medium identification information, reads out the server address and the memory medium identification information using a read-out device;

connects to a server using the server address read out from the memory medium, and transmits identification information read out by said read-out device to the server to request server access permission; and the server, comprising a memory means, compares memory medium identification information sent from the client to memory medium identification information stored in memory means upon receiving a request from the client, for access permission, and sends to the client authentication information regarding server access permission or refusal based on a result of the comparison.

6. A server access authentication method as claimed in claim 5, wherein the memory means of the server stores information corresponding to the memory medium identification information regarding a period for which server access is permitted;

and the server, based on the memory medium identification information sent from the client requesting server access permission references said period information stored in the memory means and sends the client authentication information regarding server access permission or refusal.

* * * * *